Nov. 29, 1966 W. J. DAVIS 3,288,176
MACHINE AND METHOD FOR ASSEMBLING COIL SPRINGS
IN THE PRODUCTION OF MATTRESSES
Filed Oct. 31, 1963 7 Sheets-Sheet 1

Fig. 1.

Inventor:
Wilton J. Davis.
By. Byron Lime Groen & Clement
Attys.

Inventor.
Wilton J. Davis.
By Byron Hume Groen & Clement
Attys

Inventor:
Wilton J. Davis,
By Byron Hume Groen & Clement
Attys

United States Patent Office 3,288,176
Patented Nov. 29, 1966

3,288,176
MACHINE AND METHOD FOR ASSEMBLING COIL SPRINGS IN THE PRODUCTION OF MATTRESSES
Wilton J. Davis, Massillon, Ohio, assignor to Posture Products, Inc., Massillon, Ohio, a corporation of Delaware
Filed Oct. 31, 1963, Ser. No. 320,318
12 Claims. (Cl. 140—3)

The invention relates to production of mattresses and the like, and has more particular reference to a method and apparatus for assembling helical coil springs and for tying together the end convolutions of said coil springs to form a connected and completed structure for insertion in a mattress.

The tie wires employed by the present apparatus in connecting the end convolutions of the coil springs are such as shown in the Levine Patent 2,232,072. The tie wires are characterized by a plurality of hook-like parts bent therefrom and which are so shaped that one portion of a hook-like part engages the underlapped end convolution of one coil spring and the other portion of the hook-like part engages the overlapping end convolution of an adjacent coil spring. The hook-like parts, having the general shape of an S, are spaced uniformly along the length of the tie wires and the ends of the tie wires are bent at right angles for engagement and for gripping by the chucks which rotate the tie wires.

To facilitate the interconnecting of adjacent coil springs the convolutions at the top end are tilted or canted in an upward direction, and the bottom end convolutions of the same coil springs are tilted in a downward direction. This is possible in the present apparatus since the tie wires are disposed exteriorly of the convolutions, both top and bottom, and the said tie wires are rotated while the convolutions remain tilted for connecting relation, first with the convolution of the rearward coil spring, that is, the first inserted spring, and then for connecting relation with the convolution of the forward coil spring, that is, the second inserted spring. To complete the interconnecting operation, the tilted convolutions both top and bottom are returned to their horizontal or coplanar relation, and then a separating action is effected by movement of the forward coil spring in a forward direction simultaneously with movement of the rear coil spring in a rear direction.

Based on the foregoing, one of the primary objects of the invention is to provide vertical reciprocating transfer members which position the respective tie wires adjacent the overlapping and tilted top and bottom convolutions of adjacent transverse rows of coil springs, and which remain in position for a limited time so as to support the tie wires for rotation. Operation of the vertical reciprocating transfer member as herein described is possible since the tie wires are positioned by said transfer members exteriorly of the overlapping and tilted end convolutions and then rotated to connect the adjacent convolutions in a manner whereby the nose of the hook-like parts of the tie wires are located inwardly of the completed structure. By this operational procedure the projections on the top and bottom surfaces of the completed structure, such as would otherwise exist by reason of the nose portions, are entirely eliminated and smooth surfaces result.

Another object of the invention is to provide unit advancing fingers which will perform a dual function. In the order of operation, the fingers first perform the function of tilting or canting the top and bottom convolutions of adjacent transverse rows of coil springs in an upward and downward direction, respectively. Secondly, the unit advancing fingers have movement in a rear direction to assist in positioning the interconnected coil springs structure rearwardly, whereby one tying operation is terminated and the partially completed structure is conditioned for another tying operation.

Another object resides in the provision of collet chucks for gripping and rotating the tie wires and wherein the tie wires have bent ends to assist the chucks in said operations.

A further object resides in the provision of apparatus for assembling and connecting transverse rows of coil springs and which will employ pivoted levers and power cylinders for actuating the levers in proper timed relation whereby to impart the desired movement to the various fingers including advancing, center and unit fingers.

An additional object of the invention is to provide apparatus as described wherein the advancing, center and unit fingers have vertical and horizontal reciprocating movement in performing their function of interconnecting the convolutions of the coil springs and in moving the connected coil spring structure through the machine intermittently following each tying operation.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

Figure 1:
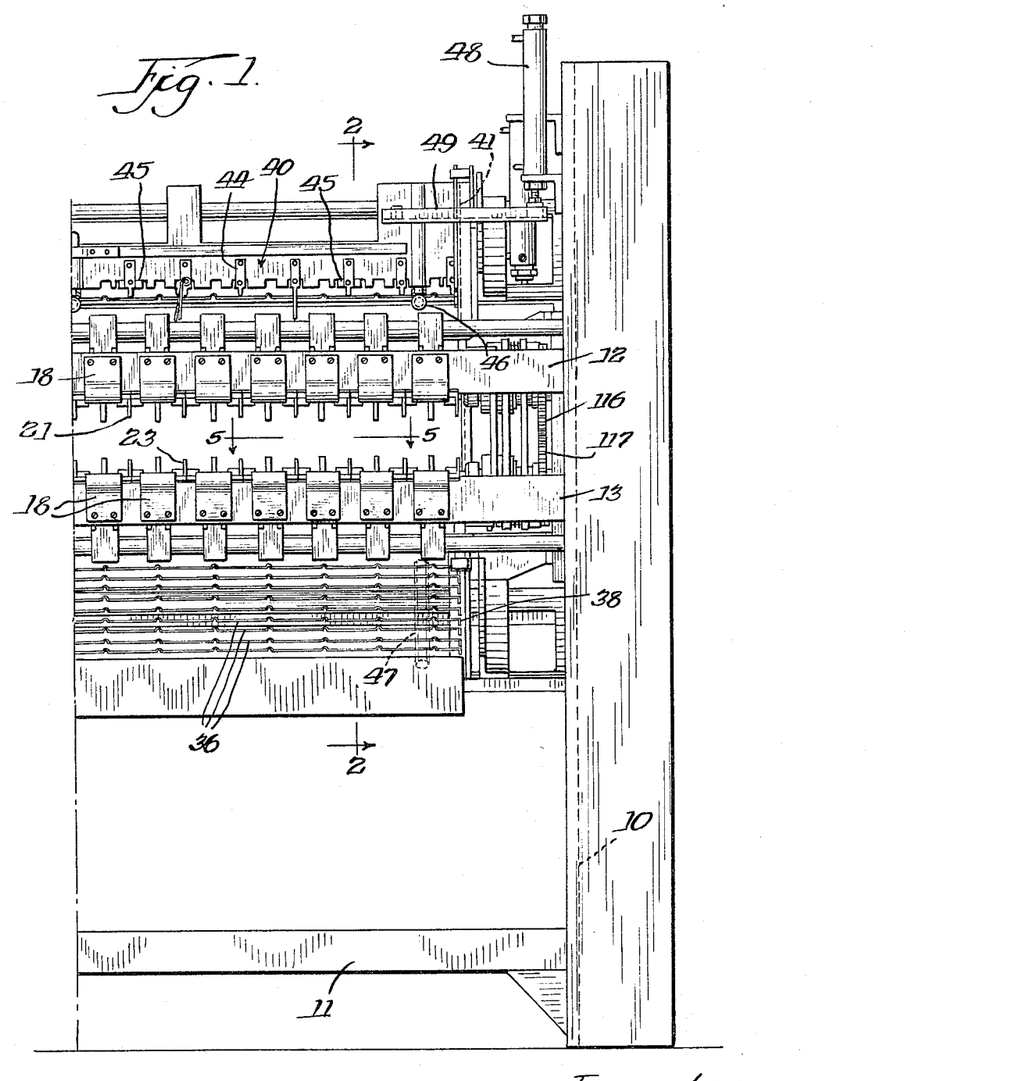
FIGURE 1 is a fragmentary elevational view of the front end of the coil assembling machine of the invention, only one-half of the machine being shown, since the same is symmetrical about a vertical center line.

The frame structure of the present coil assembly and connecting apparatus is best shown in FIGURE 1 which illustrates the right hand portion of the machine as it appears to the operator. The operator inserts helical coil springs in succession into a plurality of passageways provided by the machine and which coil springs are subsequently connected by tie wires. A side frame member such as 10 is located at each side of the machine and the side frames are connected by a plurality of transverse frame members including the member 11 at the base, the members 12 and 13 intermediate the height of the side frame 10, the angle bars 14 and 15, FIGURE 2, and the coil supporting plates 16 and 17 located to the rear of the machine as shown in FIGURES 2, 5, 6 and 9.

At spaced locations along the length of the transverse members 12 and 13, the same are provided with facing guards 18 which delineate the passageways adapted to receive the coil springs inserted by the operator. On each side of each facing guard a guide member is secured to both members 12 and 13. For the top member 12 the guide members 20 are secured to the same and the members extend rearwardly for a short distance beyond the center fingers as evidenced from FIGURE 5. It will be seen that the guide members 20 are arranged in pairs between the spaced facing guards 18 and that one member of each pair provides a depending divider 21. Thus the guide members 20 and divider 21 are disposed on respective sides of the advancing fingers and the center fingers to be presently described. The lower member 13 also supports a plurality of similar guide members 22 and which provide for upstanding dividers 23. The supporting plates 16 and 17 are each formed with rearwardly extending slots 24 and which receive the unit fingers 34 and 35, respectively. The top fingers 34 extending downwardly through the slots in plate 16, whereas the bottom unit fingers 35 extend upwardly through the slots in the supporting plate 17.

Figure 6:
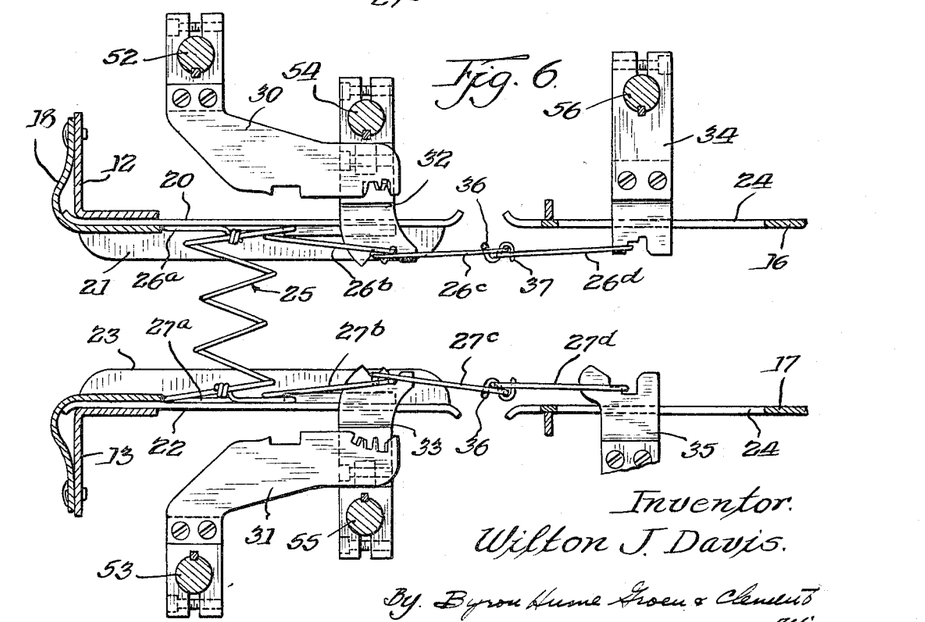
FIGURE 6 is a fragmentary vertical view taken substantially along line 6—6 of FIGURE 5 and illustrating certain action of the advancing, center and unit fingers on a succession of coil springs during their passage through the machine.
Figures 10, 11, 12, 13:
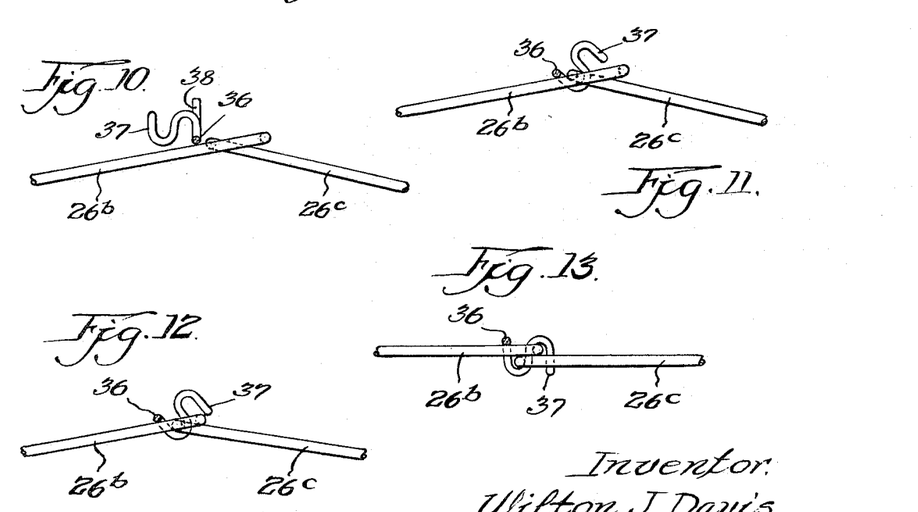
FIGURES 10, 11, 12 and 13 are schematic illustrations showing step-by-step the interconnecting of adjacent top convolutions by a tie wire.

The operator inserts the coil springs such as 25, FIGURE 6, in the passageways as delineated by the facing guards 18, and the insertion continues until the coil springs are supported by the upper and lower guide members, the upper convolution 26 come in contact with guide member 20 and the lower convolution 27 having contact with the guide member 22. The coil springs are advanced by the joint action of the advancing fingers 30 and 31 and the unit fingers 34 and 35. During each cycle, the center fingers 32 and 33 are operative along with the unit fingers in deforming or canting the top and bottom convolutions of adjacent coil springs in a manner as best shown in FIGURE 10. The tie wires 36 have the S-shaped hook parts 37 formed integral therewith. The said tie wires are interconnected with the top and bottom convolutions of the adjacent coil springs by effecting a rotation of the tie wires in a counterclockwise direction for the upper convolutions and in a clockwise direction for the bottom convolutions. Following the insertion of the necessary number of coil springs in succession for each of the passageways, the first operation consists in feeding the tie wires by means of the vertically reciprocable transfer members shown in FIGURE 2.

Figure 2:
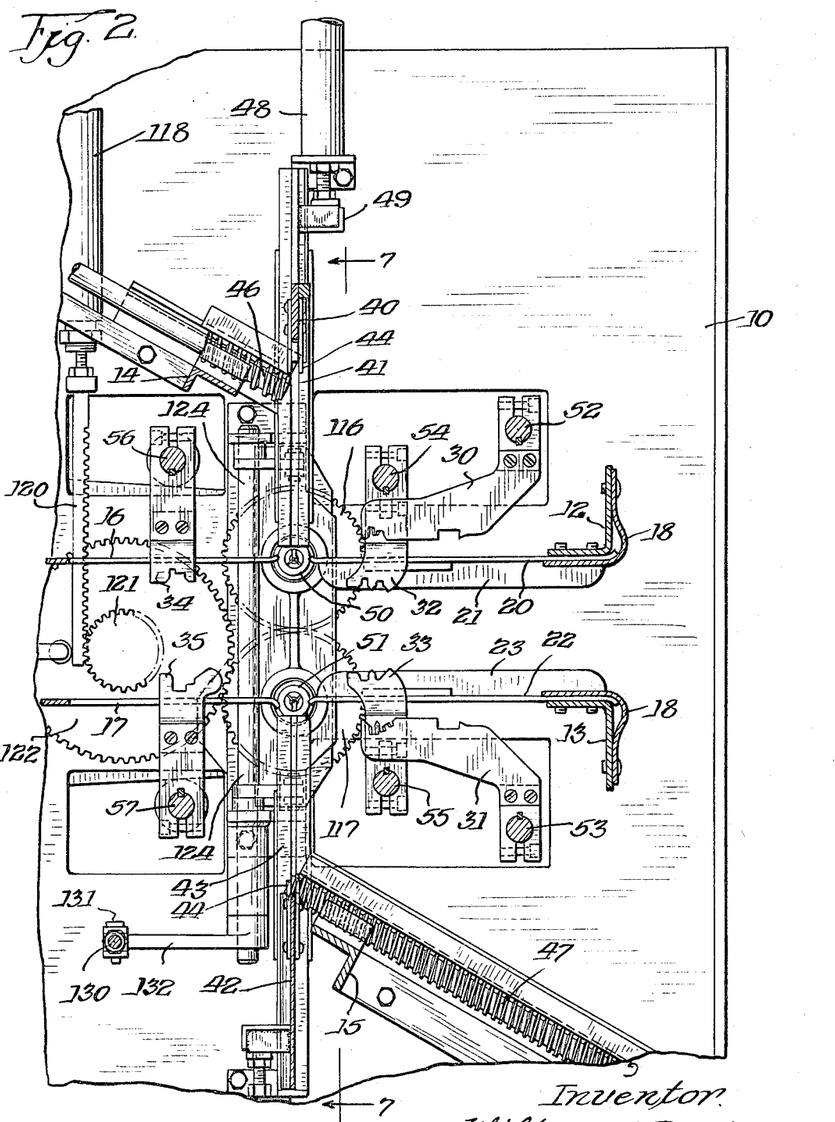
FIGURE 2 is a vertical sectional view taken substantially along line 2—2 of FIGURE 1 and showing in detail the coil advancing fingers, the center fingers and the unit fingers, and also showing the vertically reciprocable transfer members for presenting tie wires to the chucks for rotation by said chucks.

The top transfer member 40 is suitably mounted for reciprocating movement in a vertical direction by means of the guideways 41. The bottom transfer member 42 is likewise mounted for vertical reciprocating movement by the guideways 43. Each transfer member is provided with side guides such as 44 which form a slot within which is located the tie wire, whereby the tie wire can be carried by the transfer member and transferred from a loading position to a discharge position. As regards the upper transfer member 40, the same carries a plurality of magnets 45 which attract the tie wires and help in retaining the wires during downward transfer movement of the member. The transfer members 40 and 42 extend transversely of the machine from the collet chucks 50 and 51, FIGURE 7, on the right hand side of the machine to similar collet chucks located at the left hand side. Also, the said transfer members have vertical reciprocating movement from a loading position, at which time a tie wire is presented to the member, to and from a discharge position adjacent their respective collet chucks. The angle bars 14 and 15 assist in supporting and journalling the worm drives 46 and 47 which have rotation for feeding the tie wires one at a time in a selective manner to the respective transfer members. At predetermined times during each cycle of operation the transfer members 40 and 41 are caused to reciprocate in directions downwardly and upwardly, respectively, in order to locate a tie wire 36 in the slot as provided in each collet chuck for the purpose. The power means for the top transfer member is provided by the pneumatic cylinder 47 connecting with the top member by means of the connecting bar 49. Another power cylinder of similar size, not shown, is provided for reciprocating the lower transfer member 42.

It may be assumed that a tie wire is about to be fed and deposited in the slot of the chucks, respectively. However, before the chucks are rotated, it is necessary to condition the coil springs so that the rotation of the tie wires will interconnect the top and bottom convolutions of the coil springs. The progress of the coil springs through the machine and the conditioning of the said coil springs is performed by a plurality of fingers including the advancing fingers fixed to the transverse shafts 52 and 53, respectively, the center fingers fixed to the transverse shafts 54 and 55, respectively, and the unit fingers fixed to the transverse shafts 56 and 57, respectively. The coil springs are inserted in the passageways of the machine so as to be confined between the guide members 20 and 22. Eventually the advancing fingers 30 and 31 will move into contacting relation with the top and bottom convolutions of the coil springs for the purpose of advancing the same, whereby the forward end, that is, the operator's end of each passageway, is vacant and ready for receiving another coil spring. The supporting levers for the advancing fingers, and the power cylinders which effect pivoting movement of the levers and thus actuation of the advancing fingers are shown in FIGURE 3, and said structure will now be described.

Figure 3:
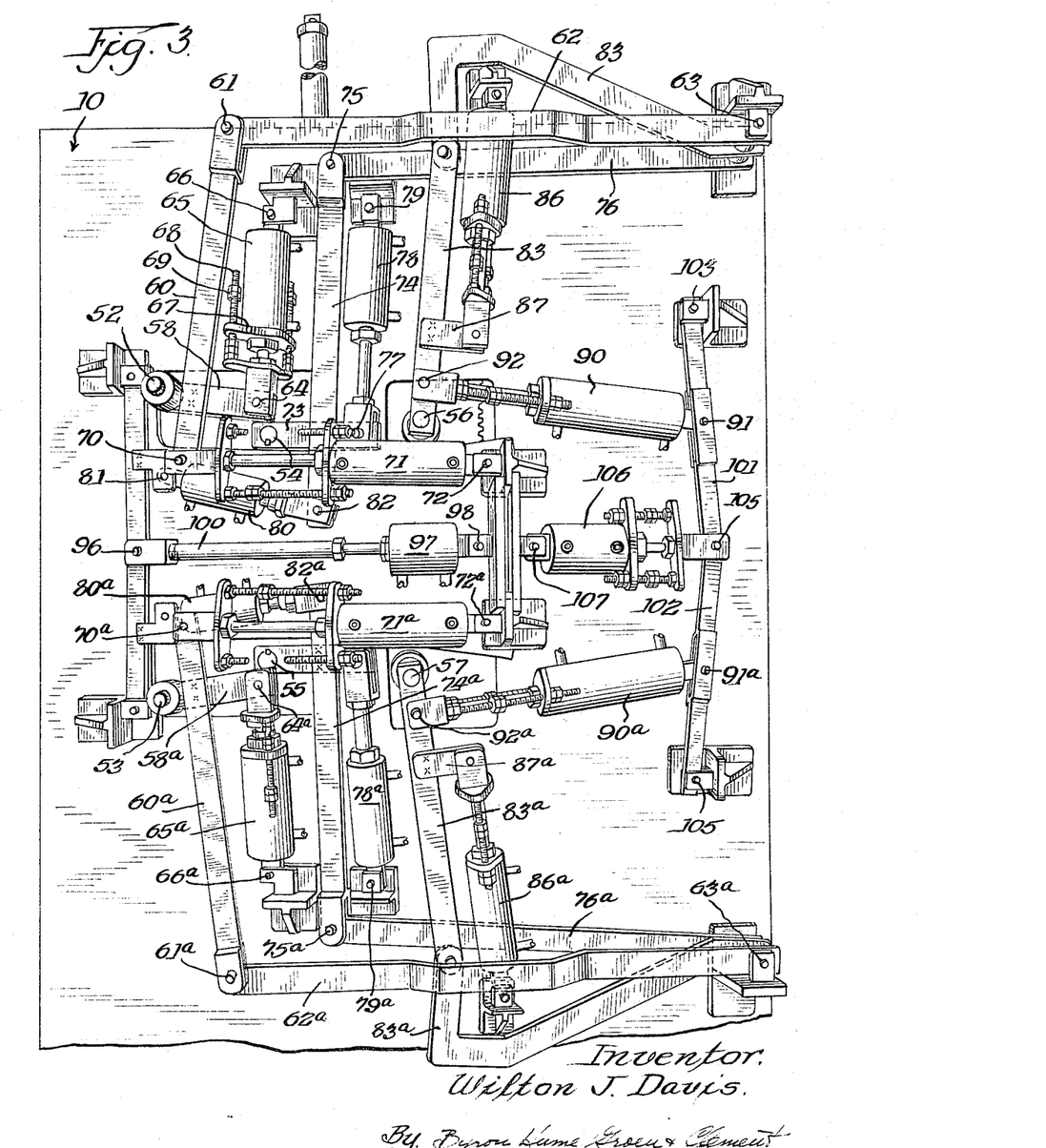
FIGURE 3 is a perspective view of one end of the coil assembling machine of FIGURE 1, the same showing in detail the levers for pivotally supporting the advancing, centering and unit fingers respectively, and said view also showing the power cylinders for actuating the various levers.

The structure of FIGURE 3 is associated with the right hand end of the machine as viewed by the operator, and since similar structure is repeated at the left hand end, only the former is disclosed for explanation. The levers and power cylinders are supported by frame member 10 which has a number of openings formed therein so that the shafts 52 to 57, inclusive, for the various fingers may extend therethrough for connection with the pivoted levers provided for the purpose.

With respect to the upper advancing fingers 30 and shaft 52 to which the fingers are fixed, it will be seen that the right hand end of the shaft extends through an opening in frame 10 for connection with the arm 58 which is suitably welded or otherwise secured to the lever 60. The top end of lever 60 is pivoted at 61 to a horizontal lever 62 which is pivotally secured at 63 to the frame 10. The right hand end of the arm 58 is pivotally connected at 64 with the piston of the power cylinder 65, the power cylinder being pivotally suspended at 66 from the frame 10. In order to control the extent of movement of the piston of said power cylinder 65, it is equipped with a yoke 67 and a pair of threaded rods 68 with positioning nuts 99 being located thereon. It will be understood that the remaining power cylinders to be described are equipped with similar structure for limiting the extent of movement of the piston when the power cylinder is rendered operative. Cylinder 65 effects up and down reciprocating movement of the shaft 52 and thus reciprocating movement in vertical direction of the fingers 30. For moving the fingers horizontally in a feeding and retracting direction the depending end of lever 60 is pivoted at 70 to the piston of power cylinder 71 which is pivotally fixed at 72 to the frame 10. Said power cylinder 71 controls the swinging movement of lever 60 and shaft 52, and thus the horizontal reciprocating movement of the fingers 30. The lower advancing fingers 31 carried by shaft 53 are similarly supported for movement by the levers 60a and 62a and by the power cylinders 65a and 71a. The parts have similar securement to the frame and thus actuation of the power cylinders 65a and 71a effects horizontal and vertical movements of the lower advancing fingers in a manner duplicating the movement of the upper advancing fingers.

Figure 4:
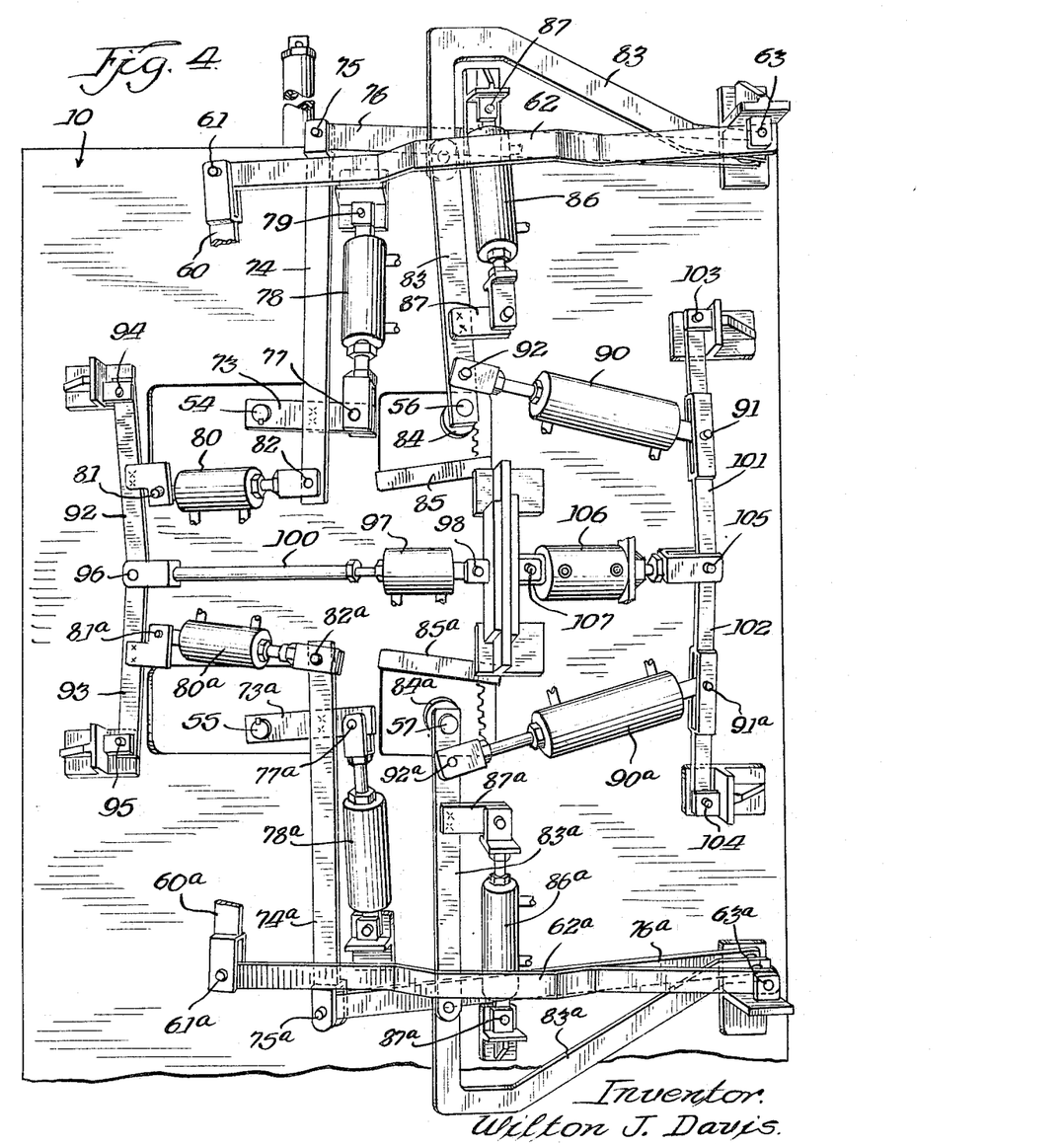
FIGURE 4 is a perspective view similar to FIGURE 3 but showing the pivoted levers and the power cylinder for the center and unit fingers only.
Figure 5:
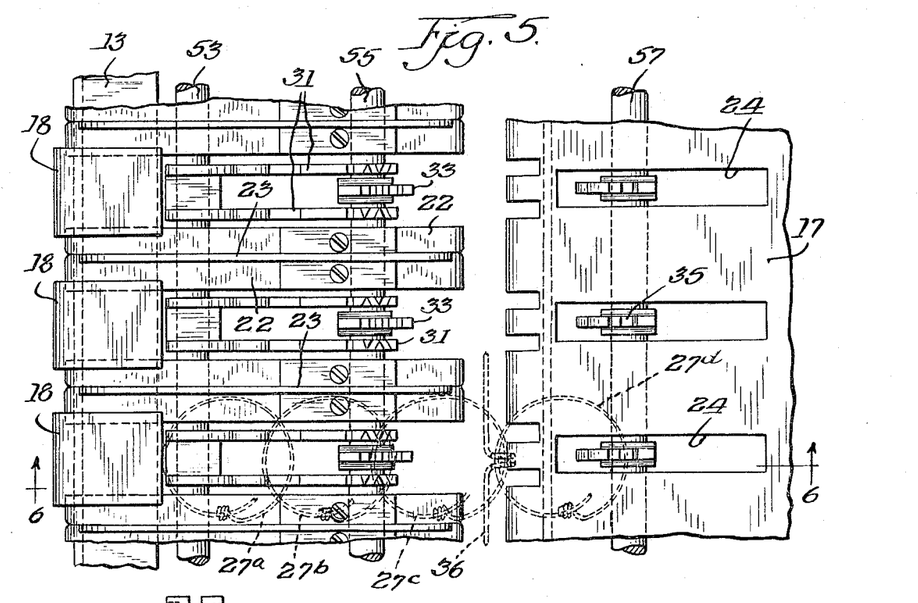
FIGURE 5 is a fragmentary horizontal view taken substantially along line 5—5 of FIGURE 1.

The supporting and actuating means for the center fingers 32 and 33 is shown in FIGURES 3 and 4. The upper center fingers 32 are fixed to shaft 54 which extends through an opening in the side frame 10 for supporting relation with the arm 73. Said arm is welded or otherwise secured to the lever 74 pivoted at 75 to lever 76 anchored on the frame by the pivot 63. The arm 73 is pivotally secured at 77 to the piston of power cylinder 78 which is suspended in the frame 10 by the pivot 79. The power cylinder 78 thus effects reciprocating movement of the shaft 54 in vertical directions. Swinging or reciprocating movement in the horizontal direction is produced by power cylinder 80, pivotally secured at 81 to toggle joint structure to be presently described. The piston of power cylinder 80 is pivotally secured at 82 to the depending end of lever 74. The same structure is duplicated for shaft 55 which carries the lower center fingers 33 and similar parts are designated by similar reference characters.

The upper unit fingers 34 fixed to shaft 56 are adapted to have movement which likewise includes horizontal and vertical reciprocating movements. Here also the right hand end of shaft 56 projects through an opening in frame 10 and has connection with the depending lever 83, approximately right angled in formation and pivoted to the frame at 63. Thus all three levers, namely 62, 76 and 83 for the three sets of fingers have the same pivot. The end of shaft 56 carries a roller 84 adapted to have rolling contact at times with the track 85 which forms one edge of the opening through which the shaft extends. The vertical movements of the shaft 56 are effected by the power cylinder 86 pivoted to the frame at 87. The depending end of the piston of power cylinder 86 is pivotally connected to lever 83 by the arm 87. The horizontal swinging movement of shaft 56 is produced by the power cylinder 90 pivoted at 91 to toggle joint structure to be described. The piston of power cylinder 90 is pivotally connected at 92 to the lever 83 immediately above the connection of shaft 56 with the lever. The lever and power cylinders for the lower unit fingers 35, and which are secured to shaft 57, are similar to those just described, and similar reference numerals have been applied to corresponding parts.

The power cylinders 80 and 80a have a pivotal connection at 81 and 81a with the links 92 and 93, the same providing a toggle joint structure, since the links are loosely pivoted at 94 and 95 to the frame 10 and are joined together at the pivot 96. The toggle joint structure is actuated by the power cylinder 97 anchored at 98 to the frame. At its opposite end the piston of said cylinder is connected to the pivot 96 by the rod 100. When the piston within the power cylinder 97 is moved to the right, FIGURE 4, by the injection of compressed air into the left hand end of the cylinder, it will be seen that the links 92 and 93 of the toggle are angled in a direction towards the right. This action has the effect of moving the cylinders 80 and 80a to the right, thus locating the shafts 54 and 55, carrying the center fingers, in the position of FIGURE 4 which may be considered their normal position. The power cylinders 90 and 90a are anchored in a similar manner at 91 and 91a to the links 101 and 102 of a second toggle structure which has the pivots 103 and 104 and the connecting pivot 105. The power cylinder 106 for the toggle joint structure is anchored at 107 to the frame and has connection at its piston end with the pivot 105. When the piston of the cylinder 106 is moved to the left, as in FIGURE 4, by the injection of compressed air into the right hand end of the cylinder, the action tends to move the cylinders 90 and 90a to the left, or in other words, the links 101 and 102 are straightened. Thus the shafts 56 and 57 are located in the normal position of FIGURE 4.

Figures 7, 8:
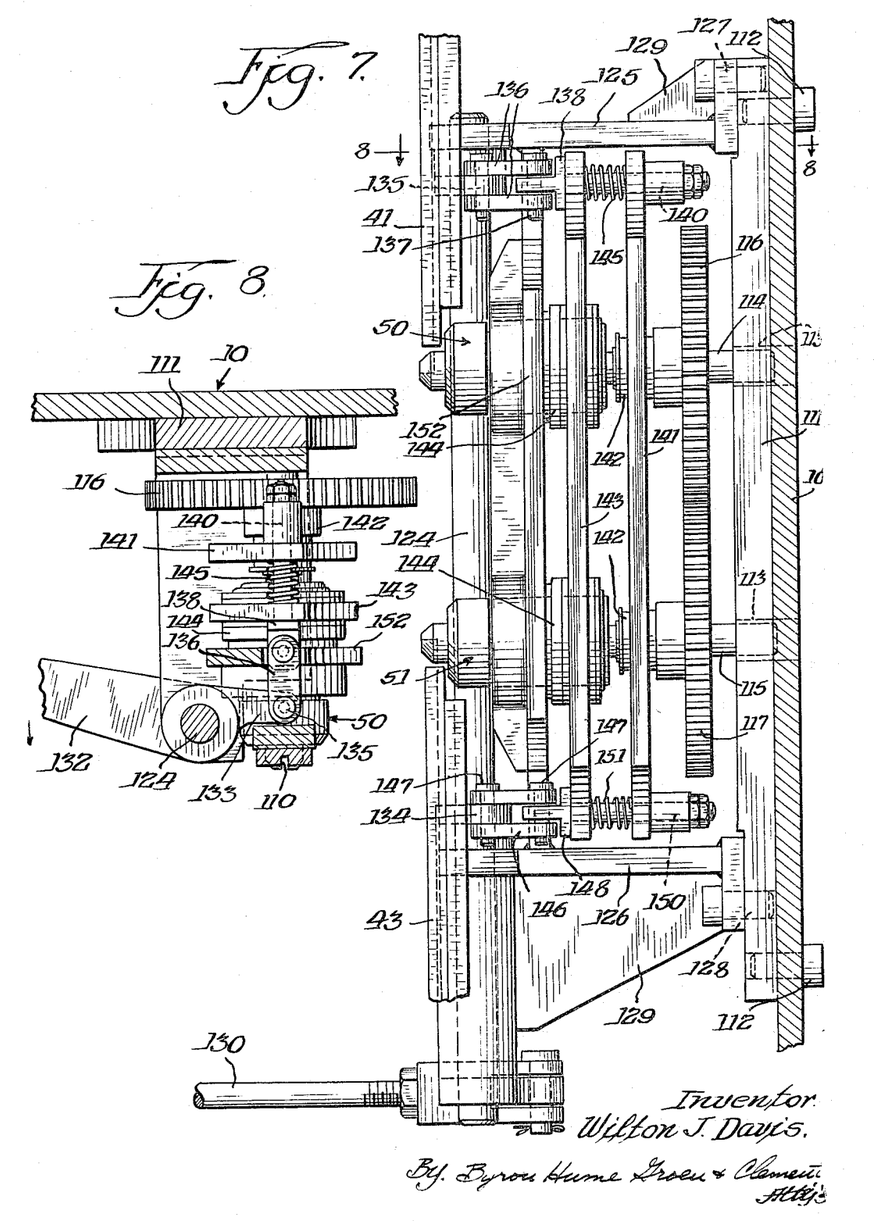
FIGURE 7 is a vertical sectional view taken substantially along line 7—7 of FIGURE 2 and showing the collet clutches for rotating the tie wires.
FIGURE 8 is a sectional view taken substantially along line 8—8 of FIGURE 7.

The chuck structure for receiving a tie wire 36 and for rotating the said tie wire is shown in FIGURES 7 and 8 wherein it will be seen that the clutches 50 and 51 each have a slot therein such as 110, FIGURE 8, for receiving a tie wire from its respective transfer member having reciprocating movement in either guideway 41 or 43. The frame structure for supporting and mounting the chucks for rotation includes a base plate 111 fixedly secured to the side frame 10 by securing screws 112. The frame 10 and base plate 111 are cored and provided with jourialling means 113 for journalling the shafts 114 and 115, the former having the driving gear 116 secured thereto and the latter having the driving gear 117 secured thereto. The gears are rotated to the same extent and simultaneously so that rotation of the clutches 50 and 51 will likewise be simultaneous and substantially to the same extent.

FIGURE 2 shows a power source for rotating the chucks intermittently and at the proper time during each cycle of operation, the same including the power cylinder 118 which is provided at its piston end with the rack 120, disposed vertically and thus being adapted to reciprocate in a vertical direction. The teeth of rack 120 have meshing engagement with the pinion 121 which drives the gear wheel 122 fixed thereto in any suitable manner, and concentric with the pinion. The gear 122 meshes with gear wheel 117, which in turn has meshing engagement with gear wheel 116. At predetermined times during each cycle of operation the power cylinder 118 is energized to effect downward travel of the rack 120. The extent of said downward movement is controlled so that the chucks are rotated simultaneously and to the desired extent whereby rotation of a tie wire is caused to take place for interconnecting the convolutions of the coil springs 25 in a selective manner as will be presently described.

Immediately preceding and during the time the chucks are rotated, they are disposed inwardly of the machine in substantially vertical alignment with the guideways and it will be understood that the chucks as thus disposed not only engage the bent end 38, FIGURE 1, of the tie wires 36, but the chucks have gripping relation with the said bent ends. As the result of this gripping relation of the chucks with the tie wires, the same are positively rotated to the required extent and any possibility of a tie wire becoming disengaged from a chuck during the rotating operation is effectively prevented.

The structure for projecting the chucks into an operative position and for restricting the same is shown in FIGURES 2, 7 and 8. The main actuating shaft for accomplishing this function is indicated by numeral 124 and which is mounted for rotation in the spaced upper and lower supporting plates 125 and 126, FIGURE 7. Plate 125 is suitably secured to backing plate 111 by securing screws such as 127, whereas the bottom supporting plate 126 is secured to the backing plate by securing screws 128. The supporting plates may be reinforced by angle plates such as 129. The actuating shaft 124 is rotated at predetermined times by the rod 130 which may be reciprocated by means of a cam or in any other suitable manner. By means of the pivot connection 131 the rod 130 is joined to an arm 132 having a fixed connection with the lower depending end of shaft 124. At spaced location along the length of the shaft 124 the same is provided with an arm 133 and an arm 134, arm 133 being located above chuck 50 whereas arm 134 is located below chuck 51. Considering first the structure above chuck 50, it will be seen that arm 133 is pivotally connected at 135 with a pair of links 136. The links, in turn, are connected by the pin 137 to a yoke 138 forming part of and projecting from the rod 140. The rod 140 is carried by the plate member 141 which extends vertically and has coacting relation with the part 142 of chuck 50. The rod 140 also extends through plate member 143 which is likewise disposed vertically and has coacting relation with part 144 of chuck 50. The yoke 138 has contact against plate member 143 and the rod 140 carries a coil spring 145 which functions in a manner to normally maintain the plate members 141 and 143 in separated relation.

Similar structure is associated with the arm 134, the same including the links 146 connected by the pin 147 to a yoke 148 forming part of and projecting from the rod 150. Said rod 150 extends through the plate member 141, which member has coacting relation with part 142 of chuck 51. The rod 150 also extends through plate member 143 which member has coacting relation with part 144 of chuck 51. The yoke 148 thus has contact against plate member 143 and the rod carries a coil spring 151 which functions, together with spring 145, to normally maintain the plate members 141 and 143 in separated relation. The plate member 152 is fixed in position, being welded at its respective ends to the supporting plate 125 and 126. The links 136 and 146 extend through plate member 152 and said plate member assists in mounting the body portions of the chucks in a manner which permits their rotation as well as their projecting and retracting movements.

The structure of FIGURES 7 and 8 provides for rotation of the chucks 50 and 51 at the required interval during each cycle of operation, and at said times the chucks are caused to grip the bent ends of a tie wire previously fed thereto. Thus movement of rack 120, FIGURE 2, in a down direction will rotate the chucks in one direction and up movement will return the chucks to their initial position. Axial movement of the chucks to project and retract them is effected by actuation of the lever 132. A feature of the invention resides in holding the transfer members 40 and 42 in their tie wire delivering position in order to back up the tie wires while the said wires are being rotated by the chucks. This is a desirable feature on the part of the transfer members in that tie wires have considerable length and since the chucks have gripping contact with the tie wires at the bent ends 38 only. After the tie wires have been rotated to effect the necessary rotation of the same for connection with the end convolutions of the coil springs 25, the transfer members are reciprocated to their initial position and the chucks are withdrawn from their extended position to a retracted position. This rotation of the chucks in rotating the tie wires returns them to their initial position.

Figure 9:
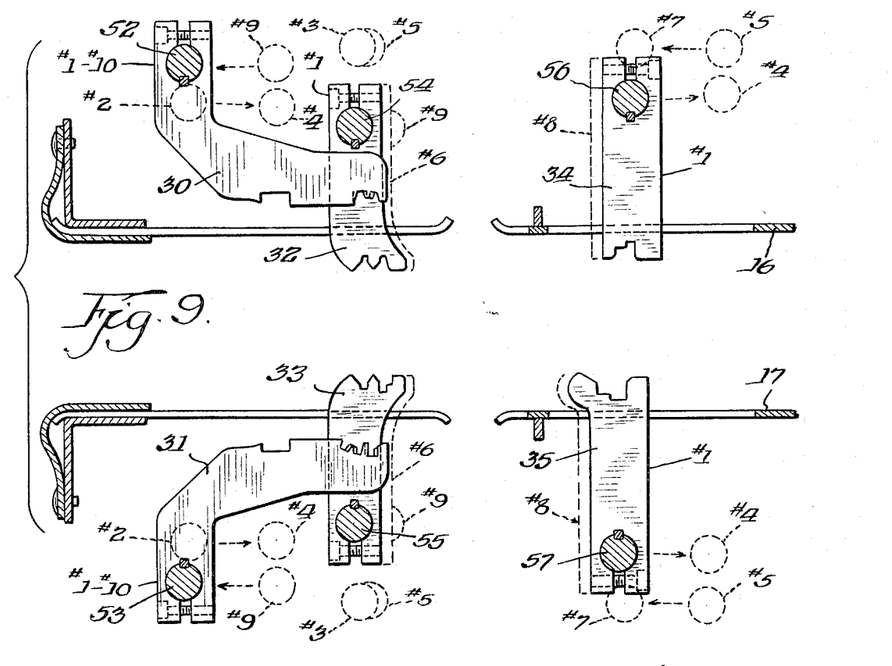
FIGURE 9 is a view similar to FIGURE 6 but illustrating by full and dotted lines the various positions of the advancing, the center and the unit fingers for one complete cycle of operation.

The operation of the entire machine is schematically illustrated in FIGURES 6 and 9. The shafts for the various fingers are shown in full lines in position #1, FIGURE 9, their normal position. The advancing fingers 30 and 31 are separated and out of contact with the coil springs 25, FIGURE 6. The center fingers 32 and 33 are operative and in contact with the convolutions 26b, 26c, 27b and 27c of coil springs which have been previously inserted in the passageways and advanced as a result of preceding feeding operations. The unit fingers 34 and 35 are also operative, since they have contact with the convolutions 26d and 27d of a coil spring previously inserted in the machine in advance of those springs in contact with the center fingers. The operator first inserts a coil spring 25 in each of the passageways and which will be thus positioned as shown in FIGURE 6, it being observed that the top and bottom convolutions of said coil springs are located exteriorly, or in other words, above and below the convolutions 26b and 27b.

For the first operation of the machine the power cylinders 65 and 65a are operated whereby the advancing fingers 30 move down and the advancing fingers 31 move up. The notches formed on the surfaces of the fingers are thus caused to have contact with the overlapping convolutions of three coil springs, that is for fingers 30 the convolutions 26a, 26b, and the convolution 26c. The fingers in moving down and in moving up take the position of #2, schematically shown in dotted lines for the shafts 52 and 53 in FIGURE 9. For position #3 the center fingers 32 are moved up and the fingers 33 are moved down, thus releasing their contact with the coil springs which, however are now held by the advancing fingers. For this action of the center fingers the power cylinders 78 and 78a are actuated and their position as indicated in FIGURE 9 by dotted lines for the shafts 54 and 55. For position #4 the advancing fingers 30 and 31 and the unit fingers 34 and 35 are moved simultaneously in a right hand direction and which constitutes a feeding action of the machine, the same requiring an operation of power cylinders 71, 71a and 90, 90a.

The location of the various coil springs following a feeding action is shown in FIGURE 9 and which may be compared with FIGURE 6.

For position #5 the center fingers and the unit fingers have been re-oriented by actuation of the toggle structures which requires operation of the power cylinders 97 and 106. As a result, the toggle structures are moved from their position shown in FIGURE 3, to that shown in FIGURE 4. FIGURE 9 shows the shafts 54, 55 and 56, 57 in dotted lines for this #5 position. During the operations from position #3, the center fingers have been out of contact with the coil springs and thus for the next operation position #6, the center fingers 32 are moved down and the center fingers 33 are moved up. Contact is again made with the coil springs although this time the center fingers engage with convolutions 26a, 27a, 26b and 27b. For this action the power cylinders 78 and 78a are actuated.

When the unit fingers were moved to position #5 they were released from contact with the coil spring. It is thus possible for said unit fingers to now have retrograde movement so that in the next cycle they can have a feeding action. Thus in position #7 the unit fingers 34 have been moved upwardly and to the left, with fingers 35 having been moved downwardly and to the left. For this action power cylinders 90 and 90a were rendered operative. In the next position #8, the unit fingers are moved into contact with the coil springs again, said action requiring operation of the power cylinders 86 and 86a. It will be observed that the retrograde movement of the unit fingers 34 and 35 in moving to position #7, together with the action of power cylinders 86 and 86a in moving the unit fingers to position #8 will produce such movement of the unit fingers that the same now have contact with the forward end of convolutions 26d, 27d, FIGURE 6, and with the rearward end of convolutions 26c and 27c. It will be understood that the said convolutions 26c, 26d and 27c, 27d have been connected by a tie wire and that the entire structure within the machine has been displaced rearwardly by the feeding action of the advancing fingers and the unit fingers all as described in connection with position #4.

The next position #9 requires that the power cylinders 65, 65a and 80, 80a be operated in sequence since the advancing fingers are first withdrawn from the coil springs and then the center fingers are moved rearwardly away from the operator to effect a greater overlapping of convolutions 26b with convolutions 26c and likewise with respect to convolutions 27b and 27c. See FIGURE 10. This is required in order to provide for the necessary rotation of the tie wires for their interconnection with the overlapping convolutions.

Since the center fingers now have contact with the overlapping top and bottom convolutions 26a, 27a and 26b, 27b, and since the unit fingers contact top and bottom overlapped convolutions 26c, 27c and 26d, 27d, the convolutions to be connected will be tilted or canted as shown in FIGURE 10. The convolutions 26b, 27b overlap 26c, 27c and the same are so positioned with respect to the guideways 41 and 43 that a tie wire 36 is presented thereto also as shown in FIGURE 10, wherein it will be observed that the tie wire is displaced slightly to the left of the convolution 26c.

For position #10, the power cylinders 71 and 71a are actuated to return the advancing fingers to normal position, and also at this time in the cycle of operations, the chucks 50 and 51 are caused to move axially in a direction inwardly of the machine to their positions as shown in FIGURE 7. The chucks are thereupon rotated so that the slots 110 are aligned with the guideways whereby a tie wire can be presented to the chucks. The chucks are caused to engage the bent ends 38 of a tie wire presented thereto and to grip said ends by movement of plate member 141 towards plate member 143 and against the tension normally presented by the coil springs 145 and 150. A tie wire and the convolutions to be connected thereby, will now have the relative positions as shown in FIGURE 10. The power cylinder 118, FIGURE 2, is renderd operative to return the rack 120 to its up position, and this rotation of the chucks will rotate the tie wires in a counterclockwise direction as regards the top convolutions and in a clockwise direction as regards the bottom convolutions.

The rotating action of the tie wire as shown in FIGURES 10 and 11 will cause the base loop of the hook part 37 to engage the convolutions 26c, that is, the underlapped convolution belonging to the coil spring disposed to the rear of the machine. The nose of the hook portion will have passed through the space between the convolutions 26b and 26c, and the same will be positioned slightly above the rear of convolution 26b as shown in FIGURE 11. During this rotating action of the tie wires 36 the transfer members remain operative to perform the function of backing up the tie wires so that their rotation is controlled and so that the tie wires are caused to interconnect with the convolutions to the extent as illusrated in FIGURE 11. It will also be observed that the tie wires are held in contact with the convolutions during rotation and which assist in the rotating action of the tie wires and their coaction with convolutions 26b and 26c. When rotation of the tie wires is completed as in FIGURE 11, the transfer members are withdrawn and returned to their initial position ready for another cycle of operations.

The next position of the machine requires actuation of the toggle structures and as the result of their actuation the tie wires are caused to completely connect convolutions 26b with 26c and 27b with 27c. The action is illustrated in FIGURES 12 and 13. Energization of the power cylinders 97 and 106 to effect the separation of the pivots 96 and 105 will move the toggle structures from their FIGURE 4 position to the position as shown in FIGURE 3. Simultaneously with the operation of the toggle structures the power cylinders 80 and 80a are energized to impart additional movement to the center fingers in a forward direction. Thus a separating action of the pivots 96 and 105, together with actuation of power cylinders 80 and 80a will result in movement of the shafts 54 and 55, and thus the center fingers in a forward direction to their position #1. Likewise the shafts 56 and 57 for the unit fingers will be moved rearwardly to their initial position, namely #1. Thus both sets of fingers in returning to their initial position impart a pull to the respective coil springs and thus the tilted convolutions both top and bottom are returned to their co-planar relation. The beginning of this action is illustrated in FIGURE 12 which shows the nose 37 of the tie wire as located to the right, that is, to the rear of convolution 26b. The tilted convolutions are beginning to straighten and in FIGURE 13 it will be observed that the convolutions have been pulled into a straight line position with the result that the nose 37 of the tie wire is completely interconnected with the convolutions of both coil springs.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. A method of interconnecting the top and bottom convolutions of helical coil springs by tie wires having S-shaped hook-like parts, comprising locating and supporting a first row of coil springs, locating and supporting a second row of coil springs adjacent the first row and with the convolutions of the second row overlapping the convolutions of the first row, deforming the top convolutions of the first and second rows so that the overlapping and underlapped portions thereof project upwardly, similarly deforming the bottom convolutions of the first and second rows so that the overlapping and underlapped portions thereof project downwardly, positioning a tie wire above and below the top and bottom convolutions, respectively, with each tie wire being located relatively adjacent an underlapped convolution, rotating the tie wires to cause the base loops of the S-shaped hook-like parts to engage with the arcs of the underlapped convolutions and then pass through the spaces between the arcs formed by the underlapping and overlapped portions of the convolutions, and then effecting a separating action of the first and second rows of coil springs to cause the deformed convolutions thereof to return to a co-planar relation, whereby the outer loops of the hook-like parts of the tie wires will engage the arcs of the over-lapping convolutions and thereby interconnect the helical coil springs.

2. A method of interconnecting the top and bottom convolutions of helical coil springs by tie wires having S-shaped hook-like parts, comprising locating and supporting a first row of coil springs, locating and supporting a second row of coil springs adjacent the first row and with the convolutions of the second row overlapping the convolutions of the first row, deforming the top convolutions of the first and second rows so that the overlapping and underlapped portions thereof are tilted upwardly to a slight extent, deforming the bottom convolutions of the first and second rows so that the overlapping and underlapped portions thereof are tilted downwardly to a slight extend, feeding a tie wire to a position above and below the top and bottom convolutions, respectively, with each tie wire being located relatively adjacent an underlapped convolution and in contact with an overlapping convolution, rotating the tie wires to cause the base loops of the S-shaped hook-like parts to engage with the arcs of the underlapped convolutions and then pass through the spaces between the arcs formed by the underlapping and overlapped portions of the convolutions, and then effecting a separating action of the first and second row of coil springs to cause the deformed convolutions thereof to return to a co-planar relation, whereby the outer loops of the hook-like parts of the tie wires will engage the arcs of the over-lapping convolutions and thereby interconnect the helical coil springs.

3. A method of interconnecting the top and bottom convolutions of helical coil springs as defined by claim 2, additionally including the step of moving the two rows of coil springs as connected by the tie wires a distance so as to bring the second row of coil springs into the position formerly occupied by the first row, and repeating the cycle of operations so as to connect successive rows of coil springs with tie wires until an assembly of the desired length is produced.

4. In a machine for assembling coil springs by connecting the top and bottom convolutions of a first row of coil springs with the top and bottom convolutions of a second row by means of tie wires having S-shaped hook-like nose parts, the combination with frame members providing a plurality of passageways for receiving coil springs in succession and for supporting the same to thereby provide said first and second row of coil springs, a plurality of fingers for feeding the coil springs through the machine in a rearward direction and for conditioning the top and bottom convolutions of said coil springs before the tie wires are presented thereto, said fingers including advancing fingers, center fingers and unit fingers, transfer members for presenting said tie wires by locating the same in contact with the top and bottom convolutions, respectively, of the second row of coil springs, and means for rotating each tie wire to cause the S-shaped hook-like parts to connect the convolution of the first row of coil springs with the convolutions of the second row, both top and bottom.

5. A machine for assembling coil springs as defined by claim 4, wherein the transfer members present a tie wire to the respective convolutions of the second row at a location between the center and unit fingers, and means for effecting reciprocating movement of each transfer member to and from a tie wire receiving station and a tie wire delivering station, each said means being constructed and arranged and having such operation as to maintain contact with its tie wire during rotation thereof for connecting the convolutions whereby each transfer member functions to back-up its tie wire and thus facilitate its control during rotation.

6. A machine for assembling coil springs as defined by claim 4, wherein the means for rotating a tie wire includes a pair of rotatable chucks adapted to grip the tie wire at its respective ends, rack means for rotating the chucks, and other means for effecting axial movement of the chucks to and from operative and inoperative positions, said chucks when operatively positioned having such alignment with its transfer member as to receive a tie wire from the same.

7. A machine for assembling coil springs as defined by claim 4, wherein the transfer members present a tie wire to the respective convolutions of the second row at a location between the center and unit fingers, means for effecting reciprocating movement of each transfer member to and from a tie wire receiving station and a tie wire delivering station, each said means being constructed and arranged and having such operation as to maintain contact with its tie wire during rotation thereof for connecting the convolutions whereby each transfer member functions to back-up its tie wire and thus facilitate its control during rotation, wherein the means for rotating a tie wire includes a pair of rotatable chucks adapted to grip the tie wire at its respective ends, rack means for rotating the chucks, and other means for effecting axial movement of the chucks to and from operative and inoperative positions, said chucks when operatively positioned having such alignment with its transfer member as to receive a tie wire from the same.

8. In a machine for assembling coil springs by connecting the top and bottom convolutions of a first row of coil springs with the top and bottom convolutions of a second row by means of tie wires having S-shaped hook-like nose parts, the combination with frame members providing a plurality of passageways designed to receive coil springs in succession and for supporting the same to thereby provide said first and second row of coil springs, a plurality of fingers for feeding the coil springs through the machine in a rearward direction and for conditioning the top and bottom convolutions of said coil springs before the tie wires are presented thereto, said fingers including advancing fingers, center fingers and unit fingers, means effecting periodic movement of the advancing and unit fingers in spaced approximately parallel horizontal and vertical planes for feeding the coil springs through the machine, means for effecting periodic reciprocating movement of the center fingers in a vertical plane for assisting in the conditioning of the convolutions, transfer members for presenting said tie wires by locating the same in contact with the top and bottom convolutions respectively of the second row of coil springs and exteriorly thereof, and means for rotating each tie wire to cause the S-shaped hook-like parts to connect the convolutions of the first row of coil springs with the convolutions of the second row, both top and bottom.

9. A machine for assembling coil springs as defined by claim 8, additionally including power means for reciprocating the transfer members in a vertical plane at predetermined intervals in timed relation with the feeding of the coil springs through the machine and in timed relation with the conditioning of the convolutions thereof, and said power means being constructed and arranged and having such operation as to maintain contact with its tie wire during rotation thereof for connecting the convolutions, whereby each transfer member functions to back-up its tie wire and thus facilitate its control during rotation.

10. A machine for assembling coil springs as defined by claim 8, additionally including means for effecting a separating action of the center and unit fingers in horizontal directions following rotation of the tie wires whereby the convolutions as conditioned are returned to their normal co-planar relation and whereby the tie wires are cause to complete their connection with the respective convolutions.

11. A machine for assembling coil springs as defined by claim 8, additionally including a guideway for each transfer member and which provides for vertical reciprocating movement of its transfer member, said guideways each being located between the center and unit fingers, and power means for reciprocating each said transfer member.

12. A machine for assembling coil springs as defined by claim 8, wherein said center and unit fingers have operation for conditioning the convolutions whereby to cause the top convolutions of the first and second rows of coil springs to tilt in an upward direction towards each other and to cause the bottom convolutions of said first and second rows to tilt in a downward direction towards each other, and means for effecting a separating action of the center and unit fingers in horizontal directions following rotation of the tie wires whereby the convolutions as tilted are returned to their normal co-planar relation and whereby the tie wires are cause to complete their connection with the respective convolutions.

References Cited by the Examiner
UNITED STATES PATENTS

| | | | |
|---|---|---|---|
| 2,059,117 | 10/1936 | King et al. | 140—3.1 |
| 2,232,072 | 2/1941 | Levine | 140—3.1 |
| 2,465,333 | 3/1949 | Levine | 140—3.1 |
| 2,835,280 | 5/1958 | Miers | 140—3.1 |
| 2,835,281 | 5/1958 | Miers | 140—3.1 |
| 2,926,704 | 3/1960 | Miers | 140—3.1 |
| 3,160,180 | 12/1964 | Keeble | 140—113 |

CHARLES W. LANHAM, *Primary Examiner.*

W. H. JUST, *Assistant Examiner.*